United States Patent [19]

Sugihara

[11] Patent Number: 4,895,224
[45] Date of Patent: Jan. 23, 1990

[54] BRAKE DEVICE FOR BICYCLES

[76] Inventor: Masanobu Sugihara, No. 2-18, Tamakushicho-Nishi 3 chome, Higashi-Osaka, Osaka, 578, Japan

[21] Appl. No.: 222,420

[22] Filed: Jul. 21, 1988

[30] Foreign Application Priority Data

Mar. 14, 1988 [JP] Japan .............................. 62-34070[U]

[51] Int. Cl.$^4$ ................................................ B02L 3/00
[52] U.S. Cl. ................................ 188/24.14; 188/2 D; 188/24.22; 74/489
[58] Field of Search ................ 188/2 D, 24.11, 24.14, 188/24.15, 24.22, 24.21, 24.18; 74/489

[56] References Cited

U.S. PATENT DOCUMENTS

| 637,085 | 11/1899 | Chase | 74/489 |
| 1,449,349 | 3/1923 | Pullin | 74/489 |
| 2,874,587 | 2/1959 | Schnio | 74/489 |
| 4,480,720 | 11/1984 | Shimano | 188/24.22 |
| 4,653,613 | 3/1987 | Blancas | 188/24.22 |
| 4,773,509 | 9/1988 | Sato | 188/20 |

FOREIGN PATENT DOCUMENTS 8003904  2/1982  Netherlands ...................... 188/24.22

Primary Examiner—Andres Kashnikow
Assistant Examiner—Matthew C. Graham
Attorney, Agent, or Firm—Fleit, Jacobson, Cohn, Price, Holman & Stern

[57] ABSTRACT

In a brake device for bicycles, a handlebar is provided at each end with a cylindrical grip member which is connected with an inner wire of a brake cable having an outer wire fixed to said handle bar, and the brake cable is provided with a toggle mechanism.

1 Claim, 3 Drawing Sheets

BRAKE DEVICE FOR BICYCLES

BACKGROUND OF THE INVENTION

1. Field of the Invention

This invention relates to a brake device for bicycles.

2. Statement of the Prior Art

Bicycles are now spread as convenient moving means, and belong to a technical field of the configuration and structure to which all-out consideration has been given. Making a sharp distinction between the bicycles to be put on the market and other bicycle products, attracting users' attention thereto and promoting sales in such a field all depend upon how novel they are.

Referring to brake devices for bicycles with this in mind, in all cases, they are of the structure that, as illustrated in FIG. 6, a handlebar 1 is provided at its each end with a brake handle 2 which is to be gripped to put on brakes by way of a brake cable 12 (see the embodiment to be described later).

In view of the foregoing, an object of this invention is to provide a novel or unconventional brake device for bicylcles.

In order to attain this object, a braking operation is effected by the output operation structure relying upon the turning of a grip on a handlebar in motor cycles, etc., i.e., the so-called throttle structure.

More specifically, this invention provides a brake device for bicycles, wherein a handlebar is provided at each end with a cylindrical grip member which is connected with an inner wire of a brake cable having an outer wire fixed to said handle bar, and the brake cable is provided with a toggle mechanism.

In the brake device, turning of the grip the inner wire is wound up the grip into the outer wire, thereby giving a force which is then increased through the toggle mechanism.

The reasons for the provision of the toggle mechanism are that while brakes can be easily put on by gripping of the handle 2 by the hand in the conventional embodiment shown in FIG. 6 due to the handle 2 per se forming the toggle mechanism, any force for putting on brakes cannot be obtained from a rotational force resulting directly (not through the toggle mechanism) from the grip in the braking mode of the throttle structure.

It is noted that better results may be obtained if means for preventing incidental turning of the grip during cycling is taken. For instance, the handlebar may be provided with a pin which is adapted to be normally fitted into the grip by means of a spring, etc. and be pushed in to turn the grip.

BRIEF DESCRIPTION OF THE DRAWINGS

This invention will now be explained with reference to one specific embodiment illustrated in the accompanying drawings, which are given for the purpose of illustration alone, and in which: -

DETAILED DESCRIPTION OF THE SPECIFIC EMBODIMENT

Figure 1:
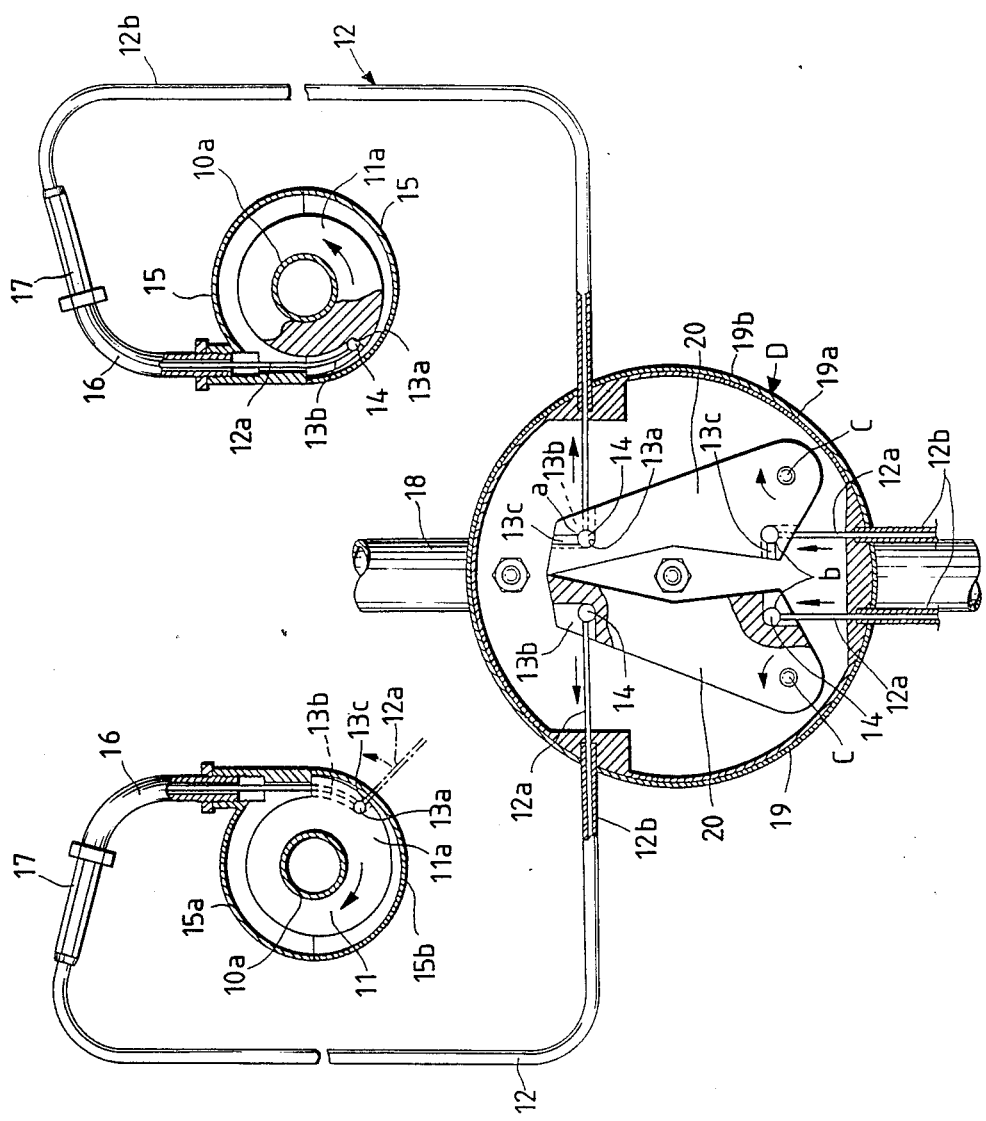
FIG. 1 is a schematically sectioned view showing a part of one embodiment of the brake device for bicycles according to this invention.
Figure 2:
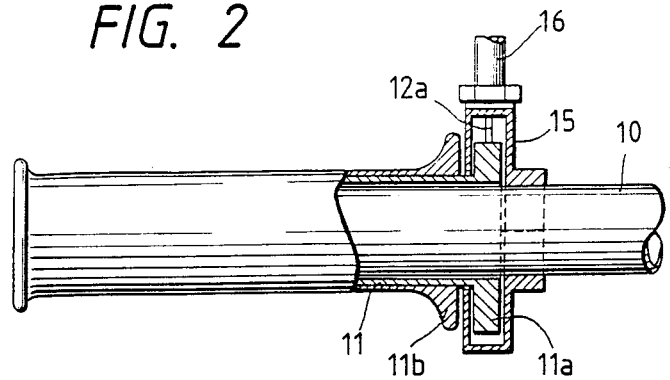
FIG. 2 is a sectional view, partly cut-away, of a part of the handlebar illustrated in FIG. 1.
Figure 3:
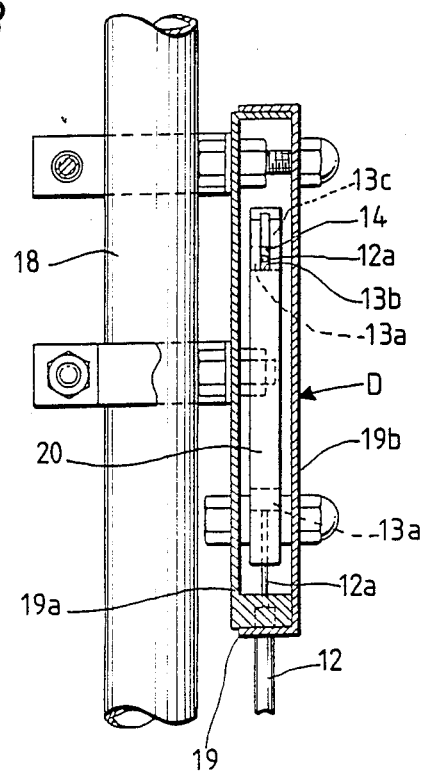
FIG. 3 is a sectioned side view of the toggle mechanism illustrated in FIG. 1.
Figure 4:
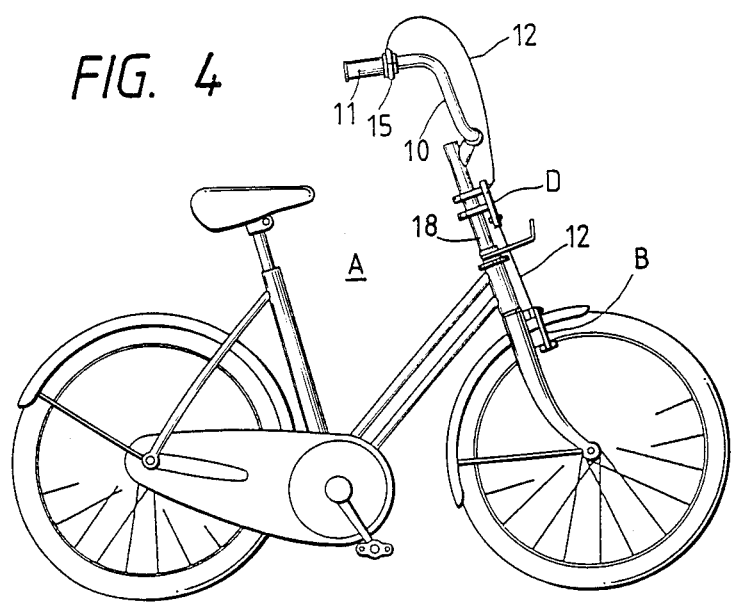
FIG. 4 is a side view of the brake device mounted on a bicycle.
Figure 5:
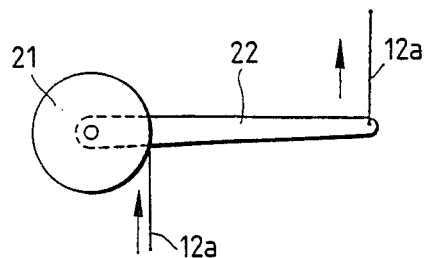
FIG. 5 is a schematical view of another embodiment of the toggle mechanisms.
Figure 6:
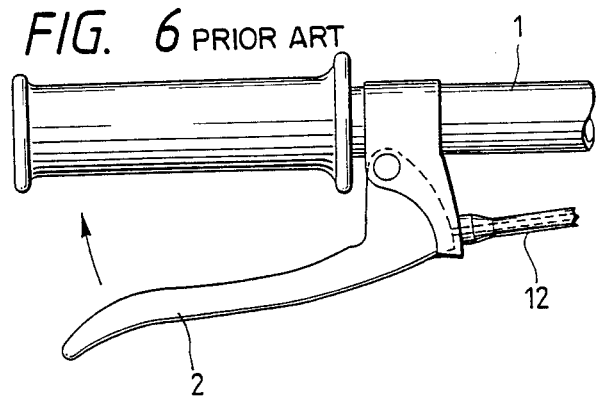
FIG. 6 is a side view of part of a conventional embodiment.

In the conventional bicycle A in FIG. 4, known configuration and structure, a cylindrical grip 11 is rotatably fitted into each end 10a of a handlebar 10, and an inner wire 12a of a brake cable 12 is connected to an end flange 11a thereof. According to this connection structure, as well-known in the art, an end stopper 14 of the inner wire 12a is inserted from the outside of the flange 11a into a locking hole 13a. Afterwards, the inner wire 12a extends along a peripheral groove 13a through a diametral slit 13b, as illustrated by a chainline arrow in FIG. 1. Reference numeral 11b stands for a grip cover.

The flange 11a is provided on its outside with a casing 15 which, as well-known in the art, is centrally split into two portions 15a and 15b united with each other by screwing and fixed to the end 10a of the handlebar. One end of an outer wire 12b of the brake cable 12 is threadedly inserted and fixed in the casing 15 through a fitting 16. Turning the grip 10 to the arrow, the inner wire 12a is wound around the peripheral face of the flange 11a, and pulled in the outer wire 12b. It is noted that the outer wire 12b is connected to the fitting 16 by caulking a connecting pipe 17.

The brake cable 12 is provided with a toggle mechanism generally shown at D, which is screwed onto a pipe 18 extending from the front fork to the handlebar 10. In the toggle mechanism D, a casing 19 comprising a base 19a and a lid 19b therefor houses a lever piece 20 having its point of force a connected with the inner wire 12a extending from the handlebar 10 and its point of application b connected with the inner wire 12a extending to a brake B. This connection structure is similar to the connection to the aforesaid flange 11a. The outer wire 12b is fitted and fixed in the casing 15. When the inner wire 12a is pulled in toward the handle 10, as shown by the arrow in FIG. 1, the lever piece 20 is turned, as shown by the arrow, so that its pulling-in force is increased depending upon the distance ratio of the points of force and application a and b to a supprting point c, thereby actuating the brake B.

The brake B may be a commonly used type, such as block and belt types. A restoring force after braking may be obtained by a spring built in the brake B.

It is understood that as the toggle mechanism, use may be made of not only that employed in the described and illustrated embodiment but also those of various known structures such as, for instance, a structure comprising an application rod 22/winding drum 21 combination, etc.

This invention is designed to put on brakes by turning of the grips provided on the handlebar, and so provides a novel brake device for bicycles which is unavailable until now.

What is claimed is:

1. In a brake device for bicycles, a handlebar which is provided with a rotary cylindrical grip member which is connected with an inner wire of a brake cable having an outer sheath fixed to said handle bar, and wherein the inner wire is connected with a force-increasing toggle mechanism for transforming a rotary twisting action of the cylindrical grip into a pull of increased force on a brake wire, the toggle mechanism being located on a part of the bicycle spaced from the grip member.

* * * * *